US008353219B2

(12) United States Patent
Brackett et al.

(10) Patent No.: US 8,353,219 B2
(45) Date of Patent: Jan. 15, 2013

(54) DRYER FELT TENSION INDICATOR APPARATUS

(75) Inventors: Timothy J Brackett, Rockton, IL (US); Thomas A Grunder, Beloit, WI (US)

(73) Assignee: Paperchine Inc, Wilmington, DE (US)

( * ) Notice: Subject to any disclaimer, the term of this patent is extended or adjusted under 35 U.S.C. 154(b) by 395 days.

(21) Appl. No.: 12/462,402

(22) Filed: Jul. 31, 2009

(65) Prior Publication Data

US 2011/0023317 A1 Feb. 3, 2011

(51) Int. Cl.
*G01N 3/08* (2006.01)

(52) U.S. Cl. .............................................. 73/829; 34/89

(58) Field of Classification Search .................... 73/826, 73/829; 34/89

See application file for complete search history.

(56) References Cited

U.S. PATENT DOCUMENTS 3,329,010 A * 7/1967 Fryfogle et al. ................ 73/816
3,778,908 A * 12/1973 Notbohm ........................ 34/116
4,393,701 A * 7/1983 Lawson .......................... 73/829
4,601,208 A * 7/1986 McKay et al. .................. 73/829

* cited by examiner

*Primary Examiner* — Lisa Caputo
*Assistant Examiner* — Punam Roy

(57) ABSTRACT

A dryer felt tension indicator apparatus is disclosed for indicating a value which is proportional to a tension applied between a frame and a stretcher roll for guiding a dryer felt. The value is proportional to a tension of the dryer felt. The apparatus includes a carriage for rotatably supporting the stretcher roll. A wheel is rotatably secured to the carriage and a tensioner having a first and a second extremity cooperates with and extends around the wheel such that the wheel is disposed between the first and the second extremity of the tensioner. A tension indicator has a first and a second end. The first end of the tension indicator is anchored to the frame. The second end of the tension indicator is secured to the first extremity of the tensioner such that in use of the apparatus, when the tension is applied to the tensioner between the wheel and the second extremity of the tensioner, the carriage and the stretcher roll rotatably supported thereon is moved relative to the frame for tensioning the dryer felt. The tension indicator indicates the value which is proportional to the tension of the dryer felt.

15 Claims, 1 Drawing Sheet

DRYER FELT TENSION INDICATOR APPARATUS

BACKGROUND OF THE INVENTION

1. Field of the Invention

The present invention relates to a dryer felt tension indicator apparatus for indicating a value which is proportional to a tension applied between a frame and a stretcher roll for guiding a dryer felt.

More specifically, the present invention relates to a dryer felt tension indicator apparatus for indicating a value which is proportional to a tension of the dryer felt.

2. Background Information

The apparatus according to the present invention provides machine operators the ability to monitor the actual force being applied to the fabric stretcher roll. Fabric tension optimization affects drying efficiency, paper shrinkage profiles and the drive capacity of the dryer section such as the "Silent Drive"™ capacity.

Thus the primary feature of the present invention is to provide a dryer felt tension indicator apparatus that enables an operator to monitor the actual force applied to the dryer felt stretcher roll.

Other features and advantages of the present invention will be readily apparent to those skilled in the art by a consideration of the detailed description of a preferred embodiment of the present invention contained herein.

SUMMARY OF THE INVENTION

The present invention relates to a dryer felt tension indicator apparatus for indicating a value which is proportional to a tension applied between a frame and a stretcher roll for guiding a dryer felt. The value is proportional to a tension of the dryer felt. The apparatus includes a carriage for rotatably supporting the stretcher roll. A wheel is rotatably secured to the carriage and a tensioner having a first and a second extremity cooperates with and extends around the wheel such that the wheel is disposed between the first and the second extremity of the tensioner.

A tension indicator has a first and a second end. The first end of the tension indicator is anchored to the frame. The second end of the tension indicator is secured to the first extremity of the tensioner. The arrangement is such that in use of the apparatus, when the tension is applied to the tensioner between the wheel and the second extremity of the tensioner, the carriage and the stretcher roll rotatably supported thereon are moved relative to the frame for tensioning the dryer felt. The tension indicator indicates the value which is proportional to the tension of the dryer felt.

In a more specific embodiment of the present invention, the carriage is movable between the first and second extremities of the tensioner.

Furthermore, the carriage includes a body having a first and a second termination. The body includes a first plate. A second plate is disposed spaced and parallel relative to the first plate. A base is rigidly secured to the plates for securing the stretcher roll to the carriage. A first caster is rotatably secured between the plates, the first caster cooperating with the frame for movably supporting the carriage relative to the frame. A second caster is rotatably secured between the plates and is spaced relative to the first caster. The second caster cooperates with the frame for movably supporting the carriage relative to the frame. A first axle is disposed adjacent to the first termination of the body, the first axle rotatably supporting the wheel. A second axle is disposed adjacent to the second termination of the body. A further wheel is rotatably supported by the second axle such that the tensioner cooperates with and extends around the further wheel.

More specifically, the wheel is a sprocket which cooperates with and engages the tensioner.

Also, the tensioner is a chain and the tension indicator is a load cell.

The load cell is temperature compensated between a temperature range of 70-400 degrees F. Also, the load cell has an operating temperature between a temperature range of minus 65-250 degrees F.

Furthermore, the load cell optionally includes a remote display for indicating the tension of the dryer felt.

Additionally, the frame includes a platform having a first and a second side. A first beam extends upwardly from the first side of the platform. Also, a second beam extends upwardly from the second side of the platform. The first beam defines a window for the reception therein of the tension indicator such that the first end of the tension indicator is anchored to the beam and the second end of the tension indicator is secured to the first extremity of the tensioner. The arrangement is such that in use of the apparatus, the tension indicator is disposed within the window for permitting viewing of the tension of the dryer felt.

Moreover, a bearing block is secured to the first beam. Also, a rod is rotatably supported by the bearing block. A guide sprocket is secured to the rod such that the guide sprocket cooperates with and guides the tensioner between the wheel and the second extremity of the tensioner.

Also, a further bearing block is secured to the second beam. A further rod is rotatably supported by the further bearing block. Additionally, a further guide sprocket is secured to the further rod such that the further guide sprocket cooperates with and guides the tensioner between the guide sprocket and the second extremity of the tensioner.

Furthermore, a further wheel is rotatably supported by the carriage such that the tensioner extends from the further guide sprocket to the further wheel. The tensioner cooperates with and extends around the further wheel so that the tensioner extends from the further wheel to the second beam.

A tension adjuster has a first and a second end and the tension adjuster extends through the second beam. The first end of the tension adjuster is secured to the second extremity of the tensioner. The second end of the tension adjuster defines a thread. A nut cooperates with the thread such that when the nut is rotated about the thread, the second extremity of the tensioner is pulled towards the second beam so that the carriage moves towards the first beam thus moving the stretcher roll towards the first beam for generating tension in the dryer felt.

Many modifications and variations of the present invention will be readily apparent to those skilled in the art by a consideration of the detailed description with particular reference to the annexed drawings that show a preferred embodiment of the present invention. However, such modifications and variations fall within the spirit and scope of the present invention as defined by the appended claims.

BRIEF DESCRIPTION OF THE DRAWINGS

Similar reference characters refer to the same parts throughout the various views of the drawings.

DETAILED DESCRIPTION OF THE DRAWINGS

Figure 1:
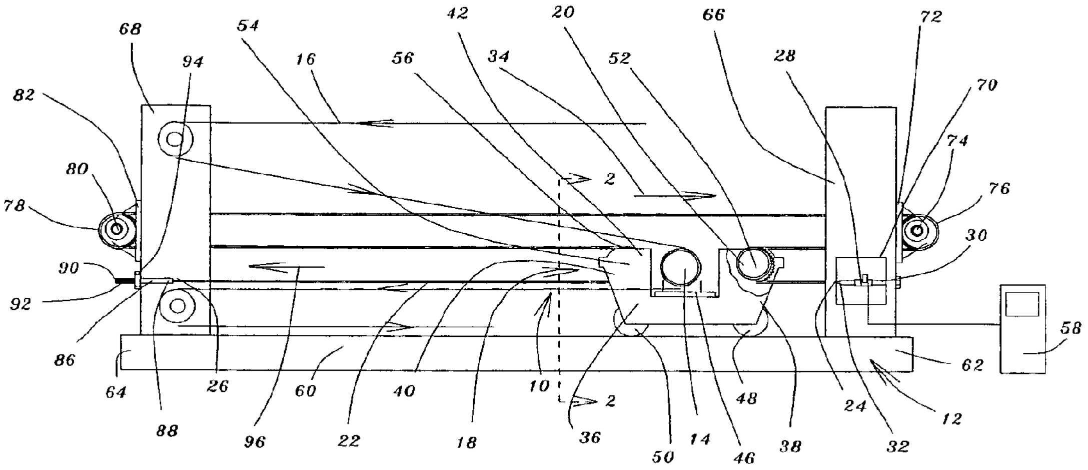
FIG. 1 is a side elevational view, partly in section, of a dryer felt tension indicator apparatus according to the present invention.

FIG. 1 is a side elevational view of a dryer felt tension indicator apparatus generally designated 10 according to the present invention.

As shown in FIG. 1, the dryer felt tension indicator apparatus 10 is for indicating a value which is proportional to a tension applied between a frame generally designated 12 and a stretcher roll 14 for guiding a dryer felt 16. This value is proportional to a tension of the dryer felt 16.

The apparatus 10 includes a carriage generally designated 18 for rotatably supporting the stretcher roll 14. A wheel 20 is rotatably secured to the carriage 18 and a tensioner 22 having a first and a second extremity 24 and 26 respectively cooperates with and extends around the wheel 20. The arrangement is such that the wheel 20 is disposed between the first and the second extremity 24 and 26 of the tensioner 22. A tension indicator 28 has a first and a second end 30 and 32 respectively. The first end 30 of the tension indicator 28 is anchored to the frame 12. The second end 32 of the tension indicator 28 is secured to the first extremity 24 of the tensioner 22. The arrangement is such that in use of the apparatus 10, when tension is applied to the tensioner 22 between the wheel 20 and the second extremity 26 of the tensioner 22, the carriage 18 and the stretcher roll 14 rotatably supported thereon is moved as indicated by the arrow 34 relative to the frame 12 for tensioning the dryer felt 16. The tension indicator 28 indicates a value which is proportional to the tension of the dryer felt 16.

In a more specific embodiment of the present invention, the carriage 18 is movable between the first and second extremities 24 and 26 of the tensioner 22.

Furthermore, the carriage 18 includes a body 36 having a first and a second termination 38 and 40 respectively. The body 36 includes a first plate 42.

Figure 2:
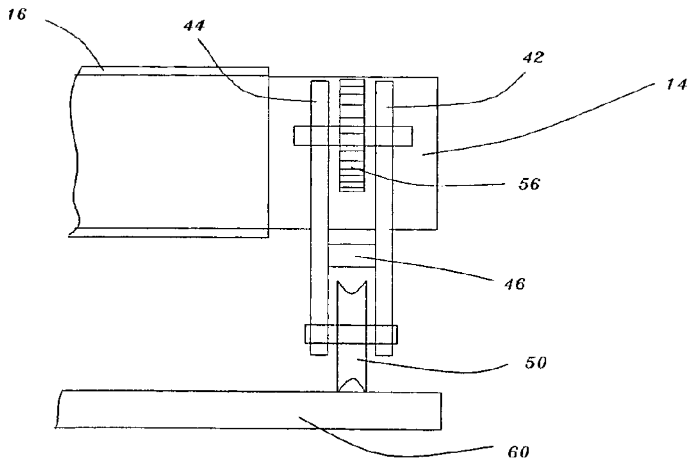
FIG. 2 is a view taken on the line 2-2 of FIG. 1 to show the carriage.

FIG. 2 is a view taken on the line 2-2 of FIG. 1 to show the carriage 18. As shown in FIG. 2, second plate 44 is disposed spaced and parallel relative to the first plate 42. A base 46 is rigidly secured to the plates 42 and 44 for securing the stretcher roll 14 to the carriage 18. A first caster 48 is rotatably secured between the plates 42 and 44, the first caster 42 cooperating with the frame 12 for movably supporting the carriage 18 relative to the frame 12. A second caster 50 is rotatably secured between the plates 42 and 44 and is spaced relative to the first caster 48. The second caster 50 also cooperates with the frame 12 for movably supporting the carriage 18 relative to the frame 12. A first axle 52 is disposed adjacent to the first termination 38 of the body 36, the first axle 52 rotatably supporting the wheel 20. A second axle 54 is disposed adjacent to the second termination 40 of the body 36. A further wheel 56 is rotatably supported by the second axle 54 such that the tensioner 22 cooperates with and extends around the further wheel 56.

More specifically, the wheel 20 and further wheel 54 are sprockets which cooperates with and engages the tensioner 22. Also, the tensioner 22 is a chain.

Moreover, the tension indicator 28 is a load cell.

The load cell 28 is temperature compensated between a temperature range of 70-400 degrees F.

Also, the load cell 28 has an operating temperature between a temperature range of minus 65-250 degrees F.

Furthermore, the load cell 28 includes a remote display 58 for indicating the tension of the dryer felt 16.

Additionally, the frame 12 includes a platform 60 having a first and a second side 62 and 64 respectively. A first beam 66 extends upwardly from the first side 62 of the platform 60. A second beam 68 extends upwardly from the second side 64 of the platform 60. The first beam 66 defines a window 70 for the reception therein of the tension indicator 28 such that the first end 30 of the tension indicator 28 is anchored to the first beam 66 and the second end 32 of the tension indicator 28 is secured to the first extremity 24 of the tensioner 22. The arrangement is such that in use of the apparatus 10, the tension indicator 28 is disposed within the window 70 for permitting viewing of the tension of the dryer felt 16.

Moreover, a bearing block 72 is secured to the first beam 66. A rod 74 is rotatably supported by the bearing block 72. A guide sprocket 76 is secured to the rod 74 such that the guide sprocket 76 cooperates with and guides the tensioner 22 between the wheel 20 and the second extremity 26 of the tensioner 22.

Also, a further bearing block 78 is secured to the second beam 68. A further rod 80 is rotatably supported by the further bearing block 78. A further guide sprocket 82 is secured to the further rod 80 such that the further guide sprocket 82 cooperates with and guides the tensioner 22 between the guide sprocket 76 and the second extremity 26 of the tensioner 22.

Furthermore, the further wheel 56 is rotatably supported by the carriage 18 such that the tensioner 22 extends from the further guide sprocket 82 to the further wheel 56. The tensioner 22 cooperates with and extends around the further wheel 56 so that the tensioner 22 extends from the further wheel 56 to the second beam 68.

A tension adjuster 86 has a first and a second end 88 and 90 respectively. The tension adjuster 86 extends through the second beam 68. The first end 88 of the tension adjuster 86 is secured to the second extremity 26 of the tensioner 22. The second end 90 of the tension adjuster 86 defines a thread 92. A nut 94 cooperates with the thread 92 such that when the nut 94 is rotated about the thread 92, the second extremity 26 of the tensioner 22 is pulled towards the second beam 68 as indicated by the arrow 96 so that the carriage 18 moves as indicated by the arrow 34 towards the first beam 66 thus moving the stretcher roll 14 towards the first beam 66 as indicated by the arrow 34 for generating tension in the dryer felt 16.

In operation of the apparatus 10, when the nut 94 is tightened, the chain 22 is pulled in the direction of arrow 96. Thus the carriage 18 moves together with the stretcher roll 14 as indicated by the arrow 34 for increasing the tension of the dryer felt 16. This tension is monitored by the load cell 28.

Accordingly, the present invention provides a unique arrangement for continuously monitoring the actual tension of the dryer felt.

What is claimed is:

1. A dryer felt tension indicator apparatus for indicating a value which is proportional to a tension applied between a frame and a stretcher roll for guiding a dryer felt, said value being proportional to a tension of said dryer felt, said apparatus comprising:

a carriage rotatably supporting the stretcher roll;

a wheel rotatably secured to said carriage;

a tensioner having a first and a second extremity, said tensioner cooperating with and extending around said wheel such that said wheel is disposed between said first and said second extremity of said tensioner; and a tension indicator having a first and a second end, said first end of said tension indicator being anchored to the frame, said second end of said tension indicator being secured to said first extremity of said tensioner such that in use of said apparatus, when the tension is applied to said tensioner between said wheel and said second extremity of said tensioner, said carriage and the stretcher roll rotatably supported thereon is moved relative to the frame for tensioning the dryer felt, said tension indicator indicating the value which is proportional to the tension of the dryer felt.

2. A dryer felt tension indicator apparatus as set forth in claim 1 wherein said carriage is movable between said first and second extremities of said tensioner.

3. A dryer felt tension indicator apparatus as set forth in claim 1 wherein said carriage includes:

a body having a first and a second termination;

said body including:

a first plate;

a second plate disposed spaced and parallel relative to said first plate;

a base rigidly secured to said plates for securing the stretcher roll to said carriage;

a first caster rotatably secured between said plates, said first caster cooperating with the frame for movably supporting said carriage relative to the frame;

a second caster rotatably secured between said plates and spaced relative to said first caster, said second caster cooperating with the frame for movably supporting said carriage relative to the frame;

a first axle disposed adjacent to said first termination of said body, said first axle rotatably supporting said wheel;

a second axle disposed adjacent to said second termination of said body;

a further wheel, rotatably supported by said second axle such that said tensioner cooperates with and extends around said further wheel.

4. A dryer felt tension indicator apparatus as set forth in claim 1 wherein said wheel is a sprocket which cooperates with and engages said tensioner.

5. A dryer felt tension indicator apparatus as set forth in claim 1 wherein said tensioner is a chain.

6. A dryer felt tension indicator apparatus as set forth in claim 1 wherein said tension indicator is a load cell.

7. A dryer felt tension indicator apparatus as set forth in claim 6 wherein said load cell is temperature compensated between a temperature range of 70-400 degrees F.

8. A dryer felt tension indicator apparatus as set forth in claim 6 wherein said load cell has an operating temperature between a temperature range of minus 65-250 degrees F.

9. A dryer felt tension indicator apparatus as set forth in claim 1 wherein said load cell includes:

a remote display for indicating the tension of the dryer felt.

10. A dryer felt tension indicator apparatus as set forth in claim 1 wherein the frame includes:

a platform having a first and a second side;

a first beam extending upwardly from said first side of said platform;

a second beam extending upwardly from said second side of said platform;

said first beam defining a window for the reception therein of said tension indicator such that said first end of said tension indicator is anchored to said beam and said second end of said tension indicator is secured to said first extremity of said tensioner so that in use of said apparatus, said tension indicator is disposed within said window for permitting viewing of the tension of the dryer felt.

11. A dryer felt tension indicator apparatus as set forth in claim 10 further including:

a bearing block secured to said first beam;

a rod rotatably supported by said bearing block;

a guide sprocket secured to said rod such that said guide sprocket cooperates with and guides said tensioner between said wheel and said second extremity of said tensioner.

12. A dryer felt tension indicator apparatus as set forth in claim 11 further including:

a further bearing block secured to said second beam;

a further rod rotatably supported by said further bearing block;

a further guide sprocket secured to said further rod such that said further guide sprocket cooperates with and guides said tensioner between said guide sprocket and said second extremity of said tensioner.

13. A dryer felt tension indicator apparatus as set forth in claim 12 further including:

a further wheel rotatably supported by said carriage such that said tensioner extends from said further guide sprocket to said further wheel, said tensioner cooperating with and extending around said further wheel so that said tensioner extends from said further wheel to said second beam;

a tension adjuster having a first and a second end, said tension adjuster extending through said second beam, said first end of said tension adjuster being secured to said second extremity of said tensioner;

said second end of said tension adjuster defining a thread;

a nut cooperating with said thread such that when said nut is rotated about said thread, said second extremity of said tensioner is pulled towards said second beam so that said carriage moves towards said first beam thus moving the stretcher roll towards said first beam for generating tension of the dryer felt.

14. A dryer felt tension indicator apparatus for indicating a value which is proportional to a tension applied between a frame and a stretcher roll for guiding a dryer felt, said value being proportional to a tension of said dryer felt, said apparatus comprising:

a carriage rotatably supporting the stretcher roll;

a sprocket rotatably secured to said carriage;

a chain having a first and a second extremity, said chain cooperating with and extending around said sprocket such that said sprocket is disposed between said first and said second extremity of said chain; and a tension indicator having a first and a second end, said first end of said tension indicator being anchored to the frame, said second end of said tension indicator being secured to said first extremity of said chain such that in use of said apparatus, when the tension is applied to said chain between said sprocket and said second extremity of said chain, said carriage and the stretcher roll rotatably supported thereon is moved relative to the frame for tensioning the dryer felt, said tension indicator indicating the value which is proportional to the tension of the dryer felt.

15. A dryer felt tension indicator apparatus for indicating a value which is proportional to a tension applied between a frame and a stretcher roll for guiding a dryer felt, said value being proportional to a tension of said dryer felt, said apparatus comprising:

a carriage rotatably supporting the stretcher roll;

a wheel rotatably secured to said carriage;

a tensioner having a first and a second extremity, said tensioner cooperating with and extending around said wheel such that said wheel is disposed between said first and said second extremity of said tensioner; a tension indicator having a first and a second end, said first end of said tension indicator being anchored to the frame, said second end of said tension indicator being secured to said first extremity of said tensioner such that in use of said apparatus, when the tension is applied to said tensioner between said wheel and said second extremity of said tensioner, said carriage and the stretcher roll rotatably supported thereon is moved relative to the frame for tensioning the dryer felt, said tension indicator indicating the value which is proportional to the tension of the dryer felt;

said carriage being movable between said first and second extremities of said tensioner;

said carriage including:

a body having a first and a second termination;

said body including:

a first plate;

a second plate disposed spaced and parallel relative to said first plate;

a base rigidly secured to said plates for securing the stretcher roll to said carriage;

a first caster rotatably secured between said plates, said first caster cooperating with the frame for movably supporting said carriage relative to the frame;

a second caster rotatably secured between said plates and spaced relative to said first caster, said second caster cooperating with the frame for movably supporting said carriage relative to the frame;

a first axle disposed adjacent to said first termination of said body, said first axle rotatably supporting said wheel;

a second axle disposed adjacent to said second termination of said body;

a further wheel, rotatably supported by said second axle such that said tensioner cooperates with and extends around said further wheel;

said wheel being a sprocket which cooperates with and engages said tensioner;

said tensioner being a chain;

said tension indicator being a load cell;

said load cell being temperature compensated between a temperature range of 70-400 degrees F.;

said load cell having an operating temperature between a temperature range of minus 65-250 degrees F.;

said load cell including:

a remote display for indicating the tension of the dryer felt;

the frame includes:

a platform having a first and a second side;

a first beam extending upwardly from said first side of said platform;

a second beam extending upwardly from said second side of said platform;

said first beam defining a window for the reception therein of said tension indicator such that said first end of said tension indicator is anchored to said beam and said second end of said tension indicator is secured to said first extremity of said tensioner so that in use of said apparatus, said tension indicator is disposed within said window for permitting viewing of the tension of the dryer felt;

a bearing block secured to said first beam;

a rod rotatably supported by said bearing block;

a guide sprocket secured to said rod such that said guide sprocket cooperates with and guides said tensioner between said wheel and said second extremity of said tensioner;

a further bearing block secured to said second beam;

a further rod rotatably supported by said further bearing block;

a further guide sprocket secured to said further rod such that said further guide sprocket cooperates with and guides said tensioner between said guide sprocket and said second extremity of said tensioner;

a further wheel rotatably supported by said carriage such that said tensioner extends from said further guide sprocket to said further wheel, said tensioner cooperating with and extending around said further wheel so that said tensioner extends from said further wheel to said second beam;

a tension adjuster having a first and a second end, said tension adjuster extending through said second beam, said first end of said tension adjuster being secured to said second extremity of said tensioner;

said second end of said tension adjuster defining a thread; and a nut cooperating with said thread such that when said nut is rotated about said thread, said second extremity of said tensioner is pulled towards said second beam so that said carriage moves towards said first beam thus moving the stretcher roll towards said first beam for generating tension of the dryer felt.

* * * * *